E. Russell
Button Chuck.

N°60,258.                    Patented Dec. 4, 1866.

Witnesses                    Inventor

United States Patent Office.

IMPROVED CHUCK FOR HOLDING BUTTONS.

EDWIN RUSSELL, OF NAUGATUCK, CONNECTICUT.

Letters Patent No. 60,258, dated December 4, 1866.

SPECIFICATION.

TO ALL WHOM IT MAY CONCERN:

Be it known that I, EDWIN RUSSELL, of Naugatuck, in the county of New Haven, and State of Connecticut, have invented a new and useful Improvement in Chucks for Polishing Buttons and other articles; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
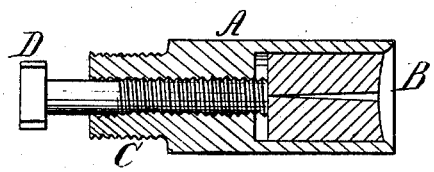
Figure 1 is a side view of a chuck made according to my invention.
Figure 2:
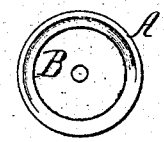
Figure 2 is an end or face view.

The object of this invention is to provide a chuck for holding buttons, such, for instance, as are made of vegetable ivory, so as to enable the workmen to polish them in a lathe, rotary motion being given to them by means of the chuck, and the body having the polishing surface being held against them. It will also be useful for holding other articles, and can be used for holding articles that run on centres. The chuck can be made of any desired shape for holding articles than can be polished by hand. It consists, in general terms, of a chuck, having a socket filled with rubber or other elastic material, which can be advanced, as it wears away, by means of a thumb-screw, operated from that end of the chuck which is secured in the mandrel. The substance or article to be polished is held against the elastic end of the chuck, and is made to revolve with it by frictional contact. A is the chuck, having a neck C, which serves to secure it to the mandrel of a lathe. Its outer end has a socket which is filled with a rubber cushion B, which is to come near enough to the end of the socket to allow it to come in contact with any object brought up to it, and to allow such object to touch the metallic part of the chuck only on its outer edge, thereby serving as a centre to the chuck. An adjusting screw D extends through the collar of the chuck, along its axial line, and enters the bottom of the socket, where its end comes in contact with the rubber filling or cushion. By these means the cushion is pushed outwards as fast as it wears away. The usual way of polishing buttons has been to put two pins in the end of a chuck, and insert them in the holes of a button. This requires the lathe to be stopped for placing every button on the pins, and every variation in the holes of the buttons requires a new adjustment and arrangement of the pins in the chuck. In using my invention, the chuck being made to revolve, the buttons or other articles to be polished are held up against the rubber centre B, by the pressure of the fingers against the buff-leather or other polishing apparatus that is used, whereby the button or other article is made to revolve by the friction excited between the elastic centre and the article to be polished. The button can be removed and another put in its place without stopping the lathe, which is a great saving of time over the usual manner of polishing these articles. My invention, it will be observed, is applicable to polishing buttons with or without holes, through their centres, whereas the usual mode of polishing buttons by the use of pins in the chuck, cannot be applied to buttons that have no holes in them. Any kind of cushion can be used that has the requisite elasticity, or that has a surface which will take hold of and revolve the article to be polished by frictional contact. My invention can be applied to burnishing ornaments of metal, and other articles.

I claim as new, and desire to secure by Letters Patent—

The chuck A, made substantially as above described, with an elastic centre B, as set forth.

EDWIN RUSSELL.

Witnesses:
GEORGE HINE,
H. F. PORTER.